(12) United States Patent
Iwata et al.

(10) Patent No.: US 6,696,807 B2
(45) Date of Patent: Feb. 24, 2004

(54) CONTROL APPARATUS OF ELECTRIC POWER STEERING

(75) Inventors: Kiyotaka Iwata, Kariya (JP); Masahide Iwazawa, Kariya (JP); Akira Itoh, Kariya (JP); Yasushi Yamada, Kariya (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/320,650

(22) Filed: Dec. 17, 2002

(65) Prior Publication Data

US 2003/0117097 A1 Jun. 26, 2003

(30) Foreign Application Priority Data

Dec. 17, 2001 (JP) ........................................ 2001-383459

(51) Int. Cl.[7] .................................................. A02P 7/00
(52) U.S. Cl. ........................ 318/432; 318/474; 318/433
(58) Field of Search ................................ 318/474, 432, 318/433, 587, 77; 180/79.1, 248

(56) References Cited

U.S. PATENT DOCUMENTS 6,041,884 A * 3/2000 Shimizu et al. ............. 180/443
6,054,827 A * 4/2000 Takatsuka et al. ........... 318/474
6,360,153 B1 * 3/2002 Shinmura et al. ............ 701/48

* cited by examiner

Primary Examiner—Karen Masih
(74) Attorney, Agent, or Firm—Oblon, Spivak, McClelland, Maier & Neustadt, P.C.

(57) ABSTRACT

A control apparatus of an electric power steering system has calculating means, controlling means, determining means suppressing means, canceling means. Calculating means calculates an assist current value that corresponds to the assist force based on steering torque of a steering wheel. Controlling means executes assist control of the motor based on the assist current value. Determining means determines an abnormality in the circuit. Suppressing means suppresses the assist control when an abnormality in the circuit is determined. If the determination of an abnormality has continued longer than a predetermined time since the suppression of the assist control, the suppressing means opens relay means that permits electric power to be supplied to the motor. When it is determined that the circuit returns to normal with the assist control suppressed, the canceling means cancels the suppression of the assist control.

14 Claims, 7 Drawing Sheets

CONTROL APPARATUS OF ELECTRIC POWER STEERING

BACKGROUND OF THE INVENTION

The present invention relates to an apparatus and a method for controlling an electric power steering system used in vehicles such as automobiles.

An electric power steering system uses an electric motor to assist movement of a steering wheel. The electric motor generates assist force to reduce force for manipulating a steering wheel, or steering force. The electric motor is controlled by a control value outputted by a control apparatus. The control value is calculated by the control apparatus based on the deviation between a control target value and a driving current that actually flows through the electric motor. An assist current value, which is a control target value related to the assist force, is calculated by the control apparatus based on the steering torque of the steering wheel. Hereinafter, this control, which is executed based on the assist current value, will be referred to as assist control.

A typical prior art control apparatus discontinues the assist control when there is an abnormality in a power supply circuit connected to the torque sensor or when the level of the detection signal is out of a normal range and such abnormality continues over a predetermined determination time. Upon stopping the assist control, the control apparatus turns off a power supply relay for supplying electric power to the motor and a relay provided in a drive circuit of the motor.

The control apparatus includes a detecting circuit that detects the motor driving current and the motor terminal voltages. Based on the detection result, an abnormality of the motor and an abnormality of a circuit that drives the motor are detected. When such abnormal condition continues over a predetermined time, the control apparatus discontinues the assist control and turns off the relays.

Conventionally, the determination time is relatively short so that, if there is an abnormality as described above, the relays are turned off at the same time as the assist control is stopped.

When detecting abnormalities using a short determination time, a detected abnormality may be dissolved after the determination time (for example, when the abnormality is caused by noises and temporally). In this case, an abnormality is erroneously detected.

SUMMARY OF THE INVENTION

Accordingly, it is an objective of the present invention to provide a control apparatus of an electric power steering, which control apparatus prevents abnormalities in circuits from being erroneously detected.

To achieve the foregoing and other objectives and in accordance with the purpose of the present invention, a control apparatus of an electric power steering system is provided. The electric power steering system is coupled to a steering wheel. The electric power steering system includes a motor and a circuit related to control of the motor. The motor generates assist force for reducing steering force of the steering wheel. The apparatus has calculating means, controlling means, determining means, and canceling means. Calculating means calculates an assist current value that corresponds to the assist force based on steering torque of the steering wheel. Controlling means executes assist control of the motor based on the assist current value such that the motor generates the assist force. Determining means determines an abnormality in the circuit. Suppressing means suppresses the assist control when an abnormality in the circuit is determined. If the determination of an abnormality has continued longer than a predetermined time since the suppression of the assist control, the suppressing means opens relay means that permits electric power to be supplied to the motor. When it is determined that the circuit returns to normal with the assist control suppressed, the canceling means cancels the suppression of the assist control.

The present invention also provides a control method of an electric power steering system coupled to a steering wheel. The electric power steering system includes a motor and a circuit related to control of the motor. The motor generates assist force for reducing steering force of the steering wheel. The method includes calculating an assist current value that corresponds to the assist force based on steering torque of the steering wheel; executing assist control of the motor based on the assist current value such that the motor generates the assist force; determining an abnormality in the circuit; suppressing the assist control when an abnormality in the circuit is determined, wherein, if the determination of an abnormality has continued longer than a predetermined time since the suppression of the assist control, a relay that permits electric power to be supplied to the motor is opened; and canceling the suppression of the assist control when it is determined that the circuit returns to normal with the assist control suppressed.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A control apparatus 20 according to a first embodiment will now be described with reference to FIGS. 1 to 4. The control apparatus 20 controls an electric power steering used in a vehicle.

Figure 1:
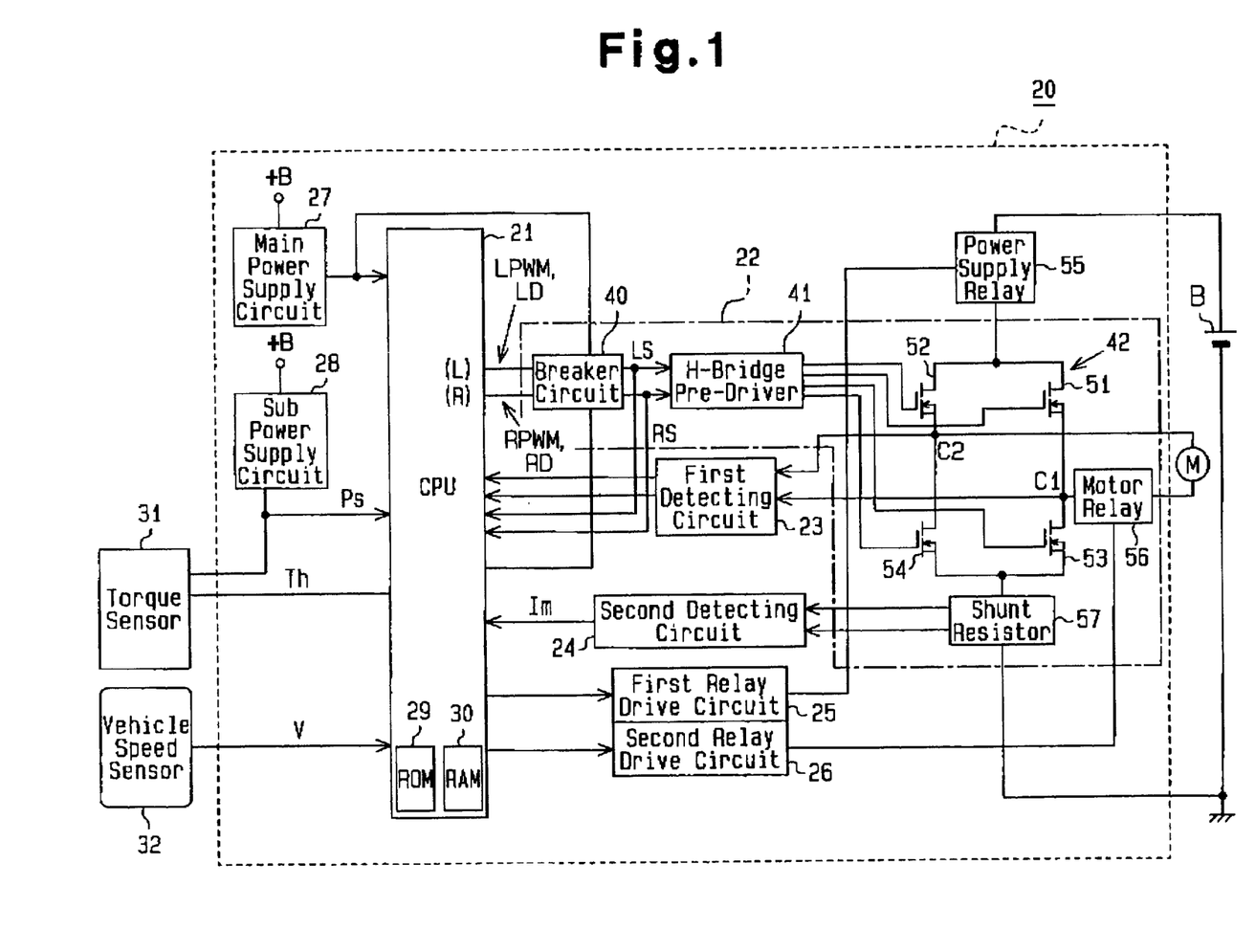
FIG. 1 is a circuit diagram showing a control apparatus of an electric power steering according to a first embodiment of the present invention.

FIG. 1 is an electric block circuit of the control apparatus 20.

The control apparatus 20 includes a central processing unit (CPU) 21, a motor drive circuit 22, a first detecting circuit 23, a second detecting circuit 24, first and second drive circuit 25, 26, a main power supply circuit 27, and an sub power supply circuit 28. The sub power supply circuit 28 supplies a voltage Ps to a torque sensor 31 from a battery B. The sub power supply circuit 28 also outputs a signal that is related to the voltage Ps applied to the torque sensor 31 to the CPU 21. The main power supply circuit 27 supplies electric power to the CPU 21 and other circuits.

The CPU 21 includes a read-only memory (ROM) 29 and a random-access memory (RAM) 30 for temporarily storing data.

The ROM 29 stores various control programs executed by the CPU 21. The RAM 30 temporarily stores calculation results of the CPU 21 when the CPU 21 executes calculations.

The torque sensor 31 is connected to the CPU 21. The torque sensor 31 detects steering torque Th of a steering wheel (not shown) and sends a detection signal to the CPU 21. A vehicle speed sensor 32 is also connected to the CPU 21. The vehicle speed sensor 32 sends a detection signal that corresponds to the number of revolution of the driving wheels, or a signal representing the vehicle speed V, to the CPU 21. Signals including the detection signals are inputted in the CPU 21 through a conventional analog-to-digital converter and an interface (neither is shown). Signals including the detection signals are outputted from the CPU 21 through a conventional digital-to-analog converter and an interface (neither is shown).

In this embodiment, the CPU 21 functions as controlling means, determining means, suppressing means, canceling means, and detecting means.

The CPU 21 is electrically connected to the second detecting circuit 24, which detects a motor driving current Im flowing through the motor M. The second detecting circuit 24 sends a signal representing the motor driving current Im to the CPU 21. The CPU 21 is connected to the first detecting circuit 23, which detects the terminal voltages of the motor M. The terminal voltages of the motor M are inputted in the CPU 21.

The CPU 21 receives detection signals from the sensors and circuits and executes various control programs such as an assist control and a fail-safe procedure. The CPU 21 computes a control value based on the detection signals. The CPU 21 executes PWM calculation based on the control value. The CPU 21 then outputs a signal based on the PWM calculation to the motor drive circuit 22 so that the motor drive circuit 22 drives the motor M. The motor M in turn generates assist force to assist the steering force of the steering wheel.

Figure 2:
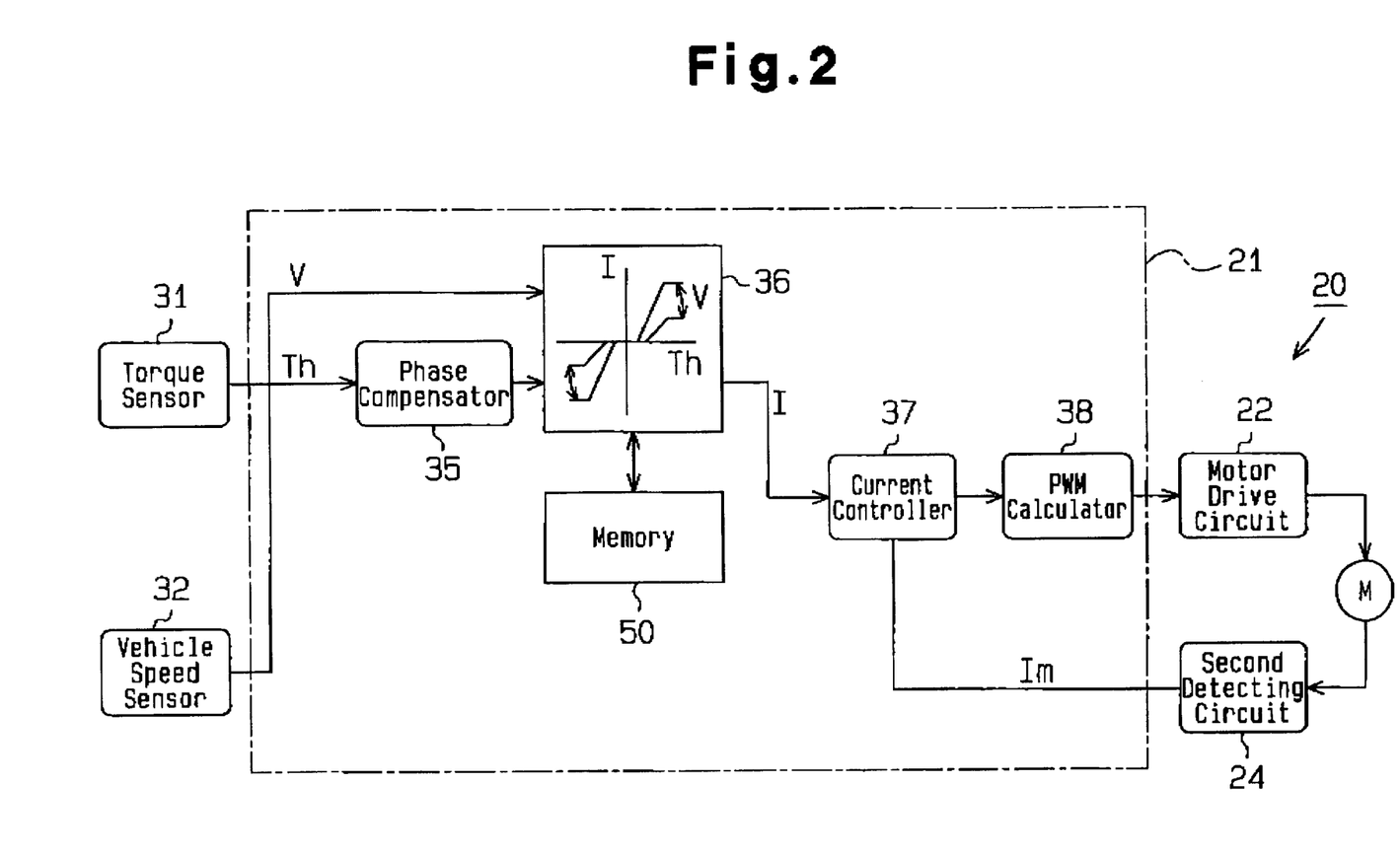
FIG. 2 is a block diagram showing the CPU of the control apparatus shown in FIG. 1.

The assist control executed by the CPU 21 will now be described. As shown in FIG. 2, the CPU 21 includes a phase compensator 35, a main calculator 36, a current controller 37, a PWM calculator 38, and a memory 50.

The phase compensator 35 compensates for the phase of the steering torque Th detected by the torque sensor 31 to improve the stability of the control apparatus 20 of the electric power steering. After the phase is compensated for, the steering torque Th is inputted in the main calculator 36. The vehicle speed V, which is detected by the vehicle speed sensor 32, is inputted in the main calculator 36. The main calculator 36 calculates an assist current value I, which corresponds to the vehicle speed V and the steering torque Th, based on an assist map stored in the ROM 29.

The assist current value I is a target value related to the assist force for reducing the steering force of the steering wheel (not shown).

The main calculator 36 supplies the assist current value I to the current controller 37. The current controller 37 calculates a PI control value and a PID control value based on the difference between the actual motor driving current Im detected by the second detecting circuit 24 and the assist current value I. The current controller 37 then outputs the control values to the PWM calculator 38.

The PWM calculator 38 executes pulse width modulation (PWM) calculation in accordance with the control values. Based on the result of the calculation, the PWM calculator 38 supplies a left pulse width modulated (LPWM) signal, a right pulse width modulated signal (RPWM), a left direction (LD) signal, and a right direction (RD) signal to the motor drive circuit 22. The motor drive circuit 22 controls the motor M based on these signals. As a result, the motor M applies a proper assist force to the steering system of the vehicle.

The memory 50 is a memory area in a part of the RAM 30. The memory 50 renews and stores the assist current value I, which is calculated by the main calculator 36 and corresponds to the state of the vehicle. During the execution of a fail-safe procedure, the main calculator 36 stops the assist control and reads a fail-safe current value Io, which had been stored immediately before the fail-safe procedure was started, from the memory 50. The main calculator 36 executes calculation such that the fail-safe current value Io gradually decreases to converge on a predetermined value, which is zero, according to a predetermined rate h (0<h<1) at predetermined intervals, thereby computing a calculation value In. The main calculator 36 outputs the calculation value In to the current controller 37. The fail-safe procedure refers to a function in which, when a part of the system malfunctions, another part complements or the system is safely stopped.

$$In = Io h\hat{}(n) \qquad (1)$$

In this equation, n represents the number of calculations. ^ represents power, and h^(n) represents h to the nth power.

During the fail-safe procedure, the current controller 37 calculates the deviation between the In obtained with the equation (1) and the motor driving current Im to execute feedback control.

A motor driver, which is a motor drive circuit 22 in this embodiment, includes a breaker circuit 40, an H-bridge pre-driver 41, and an H-bridge circuit 42.

The H-bridge circuit 42 is, for example, an n-channel MOS type field effect transistor (FET) and has first to fourth FETs 51 to 54. The first and third FETs 51, 53 are connected in series. The second and fourth FETs 52, 54 are connected in series. These series circuits are connected in parallel.

The first and second FETs 51, 52 are connected to the battery B by way of a power supply relay 55. A node C1 of the first and third FETs 51, 53 is connected to one of the terminals of the motor M by way of a motor relay 56. A node C2 of the second and fourth FETs 52, 54 is connected to the other terminal of the motor M. The third and fourth FET 53, 54 are grounded by way of a shunt resistor 57.

In this embodiment, the power supply relay 55 and the motor relay 56 function as make-and-break means.

Each of the first to fourth FETs 51 to 54 is connected to the H-bridge pre-driver 41 by way of a corresponding gate.

When voltage is supplied to a selected gate through the H-bridge pre-driver 41, the corresponding one of the FETs 51 to 54 is turned on. When only the first and fourth FETs 51, 54 are on, voltage is supplied the first FET 51, the motor relay 56, the motor M, the fourth FET, and the shunt resistor 57, which causes the motor M to rotate in a forward direction.

When only the second and third FETs 52, 53 are on, voltage is supplied to the second FET 52, the motor M, the motor relay 56, the third FET 53, and the shunt resistor 57, which causes the motor M to rotate in a reverse direction.

A command signal from the CPU 21 to the H-bridge pre-driver 41 is outputted through the breaker circuit 40. The breaker circuit 40 receives the LPWM signal, the RPWM signal, the LD signal, and the RD signal, and, based on these signals, outputs the command signal for the H-bridge pre-driver 41. The command signals include a right steering (RS) signal and a left steering (LS) signal.

The node between the breaker circuit 40 and the H-bridge pre-driver 41 is connected to the CPU 21. The RS signal and the LS signal are sent to the CPU 21. Based on a signal from the CPU 21, the breaker circuit 40 interrupts the command signal to the H-bridge pre-driver 41.

The first detecting circuit 23 is connected to the node C1 between the first and third FETs 51, 53 and to the node C2 between the second and fourth FET 52, 54, and detects both terminal voltages of the motor M.

The second detecting circuit 24 detects the motor driving current Im based on the terminal voltages of the shunt resistor 57.

Based on a command signal from the CPU 21, the relay drive circuits 25, 26 turns on and off the power supply relay 55 and the motor relay 56.

The operation of this embodiment will now be described with reference to FIGS. 3 and 4.

Figure 3:
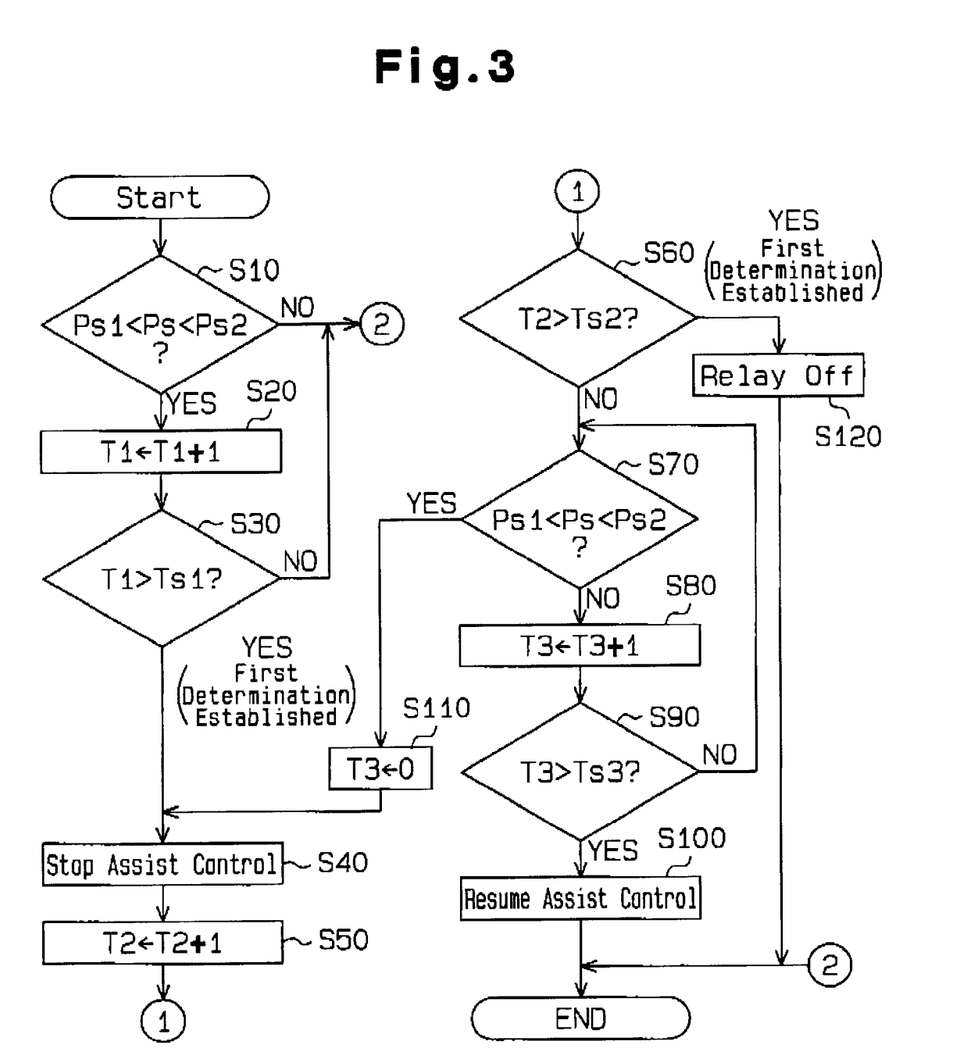
FIG. 3 is a flowchart showing a program executed by the CPU shown in FIG. 2.

FIG. 3 is a flowchart of a fail-safe program of the sub power supply circuit 28. The CPU 21 executes the program of FIG. 3 at a predetermined interval of several microseconds.

In step S10, the CPU 21 determines whether the sub power supply circuit 28 has an abnormality.

Specifically, the CPU 21 judges whether the voltage Ps of the sub power supply circuit 28 is within a predetermined range, or whether the voltage Ps is higher than a first determination value Ps1 and less than a second determination value Ps2. The first determination value Ps1 is greater than zero.

The determination values Ps1, Ps2 are stored in the ROM 29 in advance.

When the voltage Ps is in the predetermined range, the outcome of step S10 is negative, and the CPU 21 temporarily suspends the program. When the voltage Ps is out of the predetermined range, the outcome of step S10 is positive, and the CPU 21 proceeds to step S20.

In step S20, the CPU 21 adds one to a first accumulated value T1, which has been accumulated by processes before step S10, and sets the resultant as the current first accumulated value T1. Thereafter, the CPU 21 proceeds to step S30.

In step S30, the CPU 21 determines whether the first accumulated value T1 is greater than a first threshold value, which is a first determination value Ts1 (T1>Ts1). That is, the CPU 21 determines whether an abnormality in the sub power supply circuit 28 has continued for a first determination time.

If the first accumulated value T1 is less than the first determination value Ts1, the outcome of step S30 is negative, and the CPU 21 temporarily suspends the program.

When the outcome of step S30 is positive, the CPU 21 determines that the first accumulated value T1 is greater than the first determination value Ts1. That is, the CPU 21 determines that the abnormality in the sub power supply circuit 28 has continued for the first determination time and establishes a first determination. When the first determination is established, the process proceeds to the fail-safe procedure. After the fail-sate procedure, the CPU 21 resets the first accumulated value T1 to zero, and proceeds to step S40.

In step S40, the CPU 21 discontinues the assist control. At this time, the main calculator 36 of the CPU 21 reads the fail-safe current value Io from the memory 50. Subsequently, the main calculator 36 executes calculation using the equation (1) such that the fail-safe current value Io gradually decreases to converge on a predetermined value, which is zero, according to a predetermined rate h (0<h<1), thereby computing the calculation value In. The main calculator 36 outputs the calculation value In to the current controller 37.

In this embodiment, even if the assist control is not currently executed, the CPU 21 computes the assist current value I that corresponds to the vehicle speed V and the steering Th based on the assist map. When the assist control is not currently executed, the CPU 21 does not execute control of the motor M based on the assist current value I, which is obtained from the assist map.

In step S50, the CPU 21 adds one to a second accumulated value T2, which has been accumulated by processes before step S40, and sets the resultant as the current second accumulated value T2. Thereafter, the CPU 21 proceeds to step S60.

In step S60, the CPU 21 determines whether the second accumulated value T2 is greater than a second threshold value, which is a second determination value Ts2 in this embodiment (T2>Ts2). That is, the CPU 21 determines whether an abnormality in the sub power supply circuit 28 has continued for a second determination time.

If the second accumulated value T2 is less than the second determination value Ts2, the outcome of step S60 is negative, and the CPU 21 proceeds to step S70.

When the outcome of step S60 is positive, the CPU 21 determines that the second accumulated value T2 is greater than the second determination value Ts2. That is, the CPU 21 determines that the abnormality in the sub power supply circuit 28 has continued for the second determination time and establishes a second determination. Subsequently, the CPU 21 resets the second accumulated value T2 to zero, and proceeds to step S120.

In step S70, the CPU 21 judges under the same conditions as step S10 whether there is an abnormality in the power supply of the sub power supply circuit 28 based on the latest voltage Ps that is inputted in the CPU 21 when the CPU 21 starts step S70. In other words, the CPU 21 determines whether the sub power supply circuit 28 has recovered in step S70

If the outcome of step S70 is positive, that is, if the power supply of the sub power supply circuit 28 is abnormal, or if the sub power supply circuit 28 has not recovered from an abnormality, the CPU 21 proceeds to step S110. In step S110, the CPU 21 resets a third accumulated value T3, which has been accumulated, and returns to step S40. If the outcome of step S70 is negative, that is, if the sub power supply circuit 28 has recovered from an abnormality, the CPU 21 proceeds to step S80.

In step S80, the CPU 21 adds one to a third accumulated value T3, which has been accumulated, and sets the resultant as the current third accumulated value T3. Thereafter, the CPU 21 proceeds to step S90.

In step S90, the CPU 21 determines whether the third accumulated value T3 is greater than a third threshold value, which is a third determination value Ts3. If the third accumulated value T3 is equal to or less than the third determination value Ts3, the CPU 21 returns to step S70. If the third accumulated value T3 is greater than the third determination value Ts3, the CPU 21 proceeds to step S100.

In step S100, the CPU 21 resumes the assist control and resets the third accumulated value T3 to zero. Then, the CPU 21 terminates the program.

The resumption of the assist control is executed in the following manner.

When resuming the assist control, the main calculator 36 of the CPU 21 calculates an assist current value I that corresponds to the vehicle speed V and the steering torque Th inputted when the assist control is resumed based on the assist map, which is stored in the ROM 29 in advance. The main calculator 36 reads the fail-safe current value Io. Specifically, the main calculator 36 calculates the current calculation value In using the following equation (2) thereby causing the calculation value In to be gradually increased at a predetermined rate f ($0 < f < 1$) at predetermined intervals, such that the last calculation value In, which was calculated immediately before the assist control was resumed reaches the fail-safe current value Io. The main calculator 36 supplies the calculation value In to the current controller 37.

$$\text{The current calculation value} = \text{the last calculation value} + Io \cdot f(p) \quad (2)$$

In this equation, n represents the number of calculation. $f^\wedge(n)$ represents f to the pth power.

When the current calculation value In reaches the fail-safe current value Io, the main calculator 36 executes the normal assist control.

In step S110, the CPU 21 resets the third accumulation time T3 to zero.

In step 120, the CPU 21 an OFF control signal to the relay drive circuits 25, 26 to turn off the power supply relay 55 and the motor relay 56, and terminates the routine.

According to this program, the assist control is suspended in step S40 from the first determination to the second determination. From the first determination to the second determination, the power supply relay 55 and the motor relay 56 are not turned off.

If an abnormality of the sub power supply circuit 28 is dissolved from when the assist control is stopped to when the second determination is established, the assist control is resumed in step S100. This prevents erroneous determinations.

Figure 4:
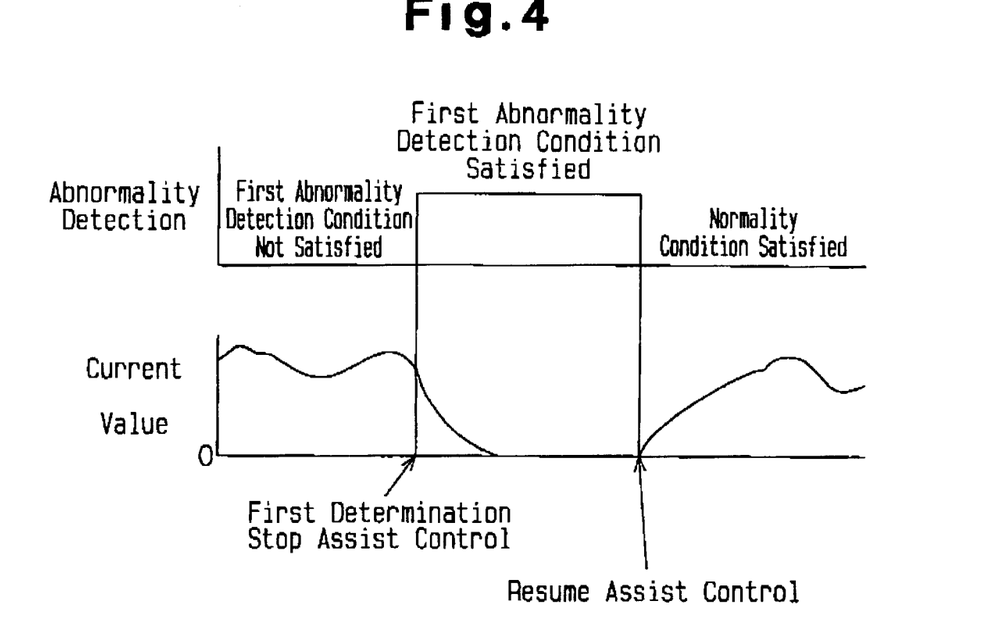
FIG. 4 is a time chart showing the relationship between abnormality detection and a current value according to the first embodiment.

FIG. 4 is a time chart showing the relationship between detection of abnormalities and the current value sent from the main calculator 36 to the current controller 37. In this chart, "First Abnormality Detection Condition Satisfied" refers to a state in which the sub power supply circuit 28 is determined to be abnormal in step S10 of FIG. 3 and the first accumulation value T1 is greater than the first determination value Ts1. "First Abnormality Condition Not Satisfied" refers to a state in which one of the conditions is not established.

"Normality Condition Satisfied" refers to a state in which the condition representing an abnormality of the sub power supply circuit 28 is not established in step S70, and the outcome of step S90 is positive, that is, when the condition representing the third accumulated time T3 is greater than the third determination value Ts3.

As shown in FIG. 3, the CPU 21 gradually decreases the current value when the first abnormality condition is established.

When the normal condition is established, the CPU 21 gradually increases the current value.

This embodiment provides the following advantages.

When detecting an abnormality in the sub power supply circuit 28, the CPU 21 suppresses the assist control. While suppressing the assist control, the CPU 21 determines whether there is an abnormality in the sub power supply circuit 28 based on the second determination value Ts2. Therefore, there is sufficient time for determining whether there is an abnormality in the sub power supply circuit 28, which prevents erroneous determinations.

If the sub power supply circuit 28 returns to normal while the assist control is suppressed, the assist control is resumed.

While suppressing the assist control, the CPU 21 determines whether the power supply of the sub power supply circuit 28 is abnormal. Therefore, the fluctuations of the current value due to manipulation of the steering wheel are reduced, and an abnormality in the power supply of the sub power supply circuit 28 is reliably detected.

After stopping the assist control, the CPU 21 does not abruptly decreases the current value. Therefore, the steering feeling is not suddenly changed.

When the sub power supply circuit 28 returns to normal and the assist control is resumed, the current value is not abruptly increased. Therefore, the steering feeling is not suddenly changed.

The CPU 21 detects an abnormality in the sub power supply circuit 28 based on a detection result of the torque sensor 31, which outputs the steering torque Th of the steering wheel.

A second embodiment will now be described with reference to FIGS. 1, 2, 5, and 6. Like or the same reference numerals are given to those components that are like or the same as the corresponding components of the embodiment shown in FIGS. 1 to 4. Mainly, the differences from the embodiment shown in FIGS. 1 to 4 will be discussed below.

Figure 6:
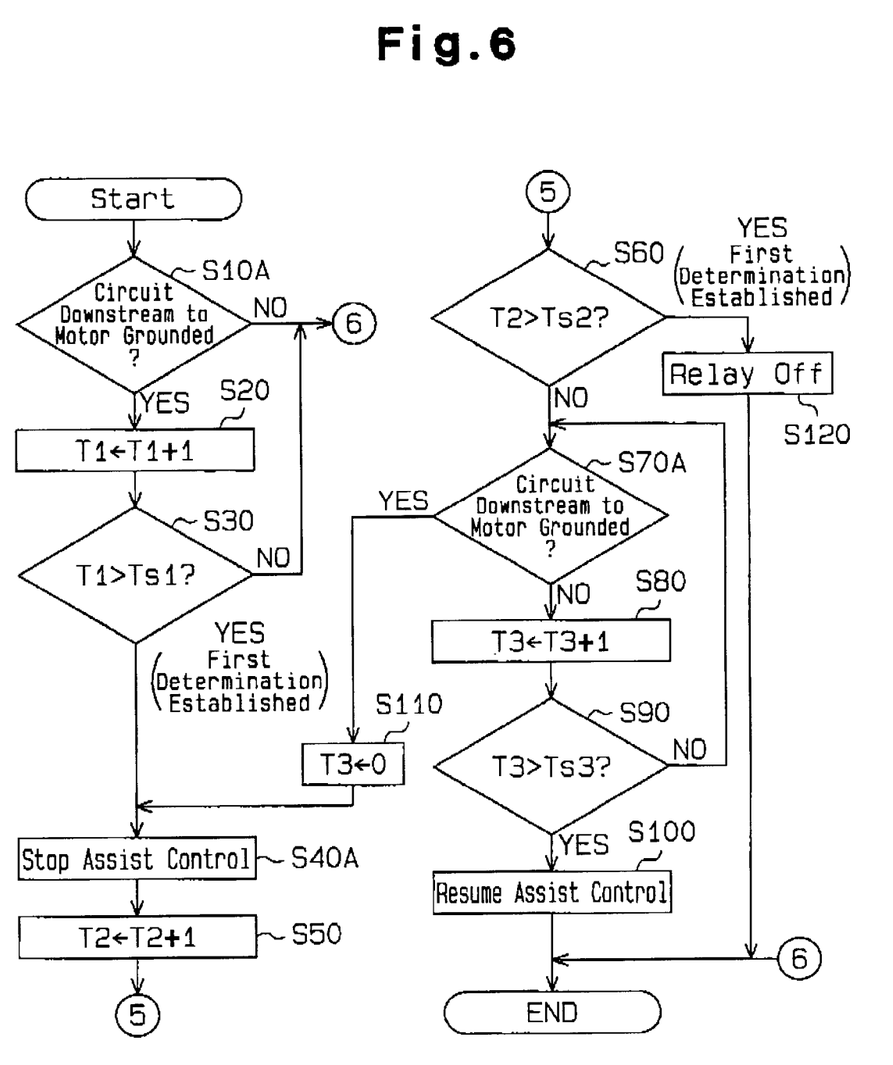
FIG. 6 is a flowchart showing a program executed by a CPU according to the second embodiment.

In this embodiment, a fail-safe program shown in FIG. 6 is executed when a section downstream of (lower voltage to) the motor M is grounded.

The CPU 21 executes the program of FIG. 6 at a predetermined interval of several microseconds.

If the outcome of step S10A is positive, that is, if the sum of the terminal voltages of the motor M is less than a predetermined fourth determination value, the CPU 21 determines that there is an abnormality in the motor M. The fourth determination value represents a state in which a circuit downstream of (lower voltage to) the motor M is grounded. If the outcome of step S10A is negative, that is, if the sum of the terminal voltages of the motor M is equal to or greater than the predetermined fourth determination value, the CPU 21 terminates the program.

Figure 5:
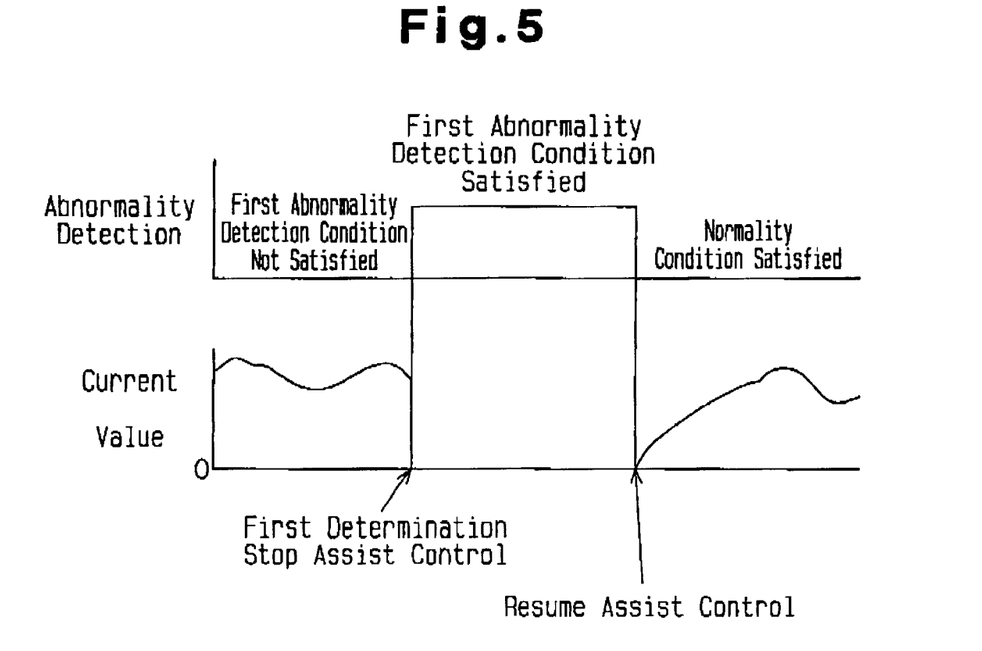
FIG. 5 is a time chart showing the relationship between abnormality detection and a current value according to a second embodiment.

When the process proceeds from step S10A to step S40A via steps S20 and S30, which are similar to those in FIG. 3, the CPU 21 quickly changes the assist current value I to a predetermined value, which is zero, as shown in FIG. 5.

After steps S40A and S50, the process proceeds to step S70A if the outcome of step 560 is negative. If the outcome of step S70A is positive, and the sum of the terminal voltages of the motor M is less than the fourth determination value as in step S10A, the CPU 21 determines that there is an abnormality in a circuit downstream of (lower voltage to) the motor M. If the outcome of step S70A is negative, that is, if the sum of the terminal voltages is equal to or greater than the fourth determination value, the CPU 21 determines that there is no abnormality in the circuit downstream of (lower voltage to) the motor M. The process proceeds to step S80, step S90, and step S100.

"First Abnormal Detection Condition Satisfied" in the chart of FIG. 5 refers to a state in which the condition for determining that there is an abnormality in a circuit downstream of (lower voltage to) the motor M in step S10A and a condition that the first accumulated time T1 is equal to or greater than the first determination value Ts1 in step S30 are both established. "First Abnormality Detection Condition Not Satisfied" refers to a state in which one of the conditions is not established.

"Normality Condition Satisfied" in the chart of FIG. 5 refers to a state in which the outcome of step S70A in FIG. 6 is negative, that is, there is no abnormality in a circuit downstream of (lower voltage to) the motor M, and the outcome of step S90 is positive, that is, the third accumulated time T3 has passed the third determination value T3.

When an abnormality is detected in a circuit downstream (lower voltage) of the motor M, the CPU 21 quickly changes the current value outputted form the main calculator 36 to zero as shown in FIG. 5.

As shown in FIG. 5, the CPU 21 gradually increases the current value when the normal condition is established, that is, when the assist control is resumed.

In addition to the advantages of the embodiment shown in FIGS. 1 to 4, this embodiment provides the following advantages.

When detecting an abnormality that a circuit downstream (lower voltage) of the motor M is grounded, the CPU 21 suppresses the assist control. While suppressing the assist control, the CPU 21 determines whether there is an abnormality based on the second determination value Ts2. Therefore, there is sufficient time for determining whether there is an abnormality, which prevents erroneous determinations.

If the detected abnormality is dissolved (normalized), the assist control is resumed.

When an abnormality that a circuit downstream of (lower voltage to) the motor M is grounded, the motor driving current Im is quickly changed to zero to stop the assist control.

A third embodiment will now be described with reference to FIGS. 1, 2, 7, and 8. Like or the same reference numerals are given to those components that are like or the same as the corresponding components of the embodiment shown in FIGS. 1 to 4. Mainly, the differences from the embodiment shown in FIGS. 1 to 4 will be discussed below.

Figure 7:
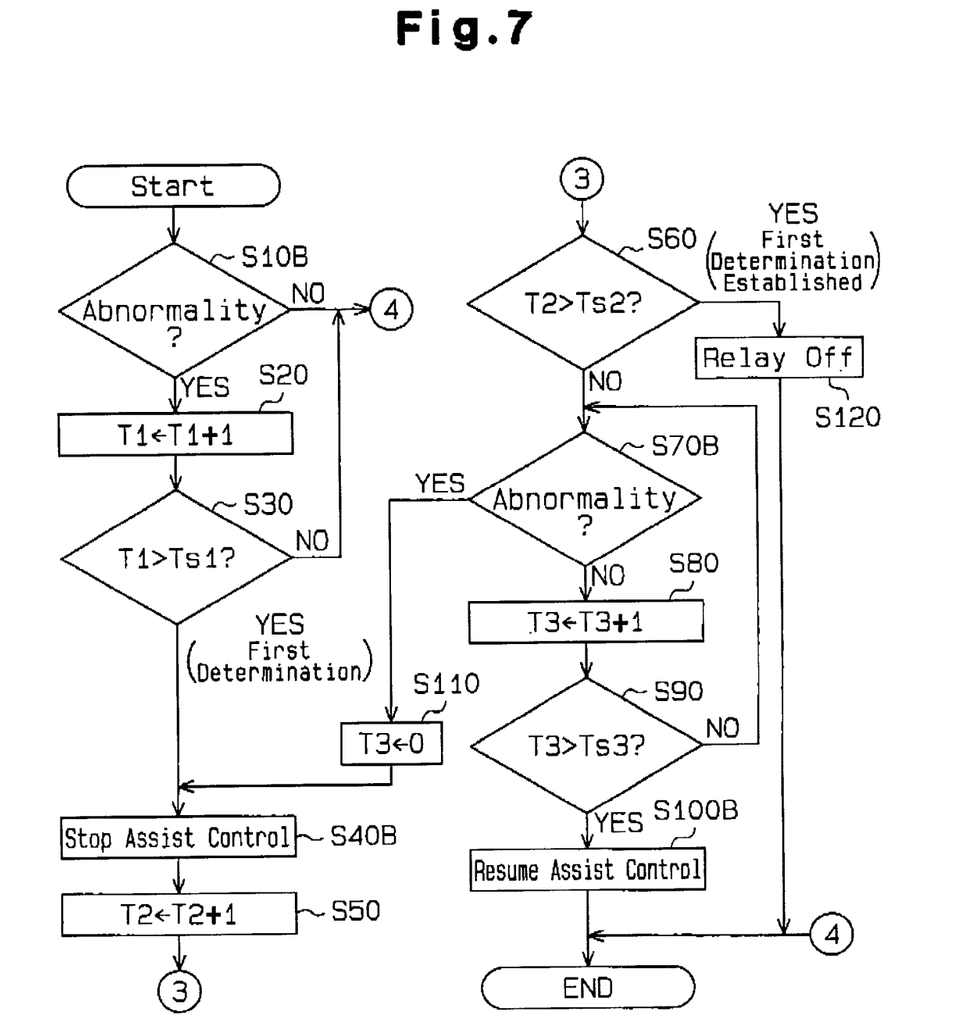
FIG. 7 is a flowchart showing a program executed by a CPU according to a third embodiment.

In this embodiment, instead of the fail-safe program of the sub power supply circuit 28 shown in FIG. 4, a fail-safe program shown in FIG. 7 is executed when there is an abnormality in the deviation between the motor driving current Im and the assist current value I.

The CPU 21 executes the program of FIG. 7 at a predetermined interval of several microseconds.

In step S10B, the CPU 21 determines whether the motor M is abnormal based on a predetermined fifth determination value. The fifth determination value represents whether there is a break in the motor M. Specifically, if the outcome of step S10B is positive, that is, if the deviation between the assist current value I and an actual current, which is the motor driving current Im, is greater than the fifth determination value, the CPU 21 determines that there is a break in the motor M. If the outcome of step S10B is negative, the CPU 21 determines that there is no break in the motor M and terminates the program.

If the outcome of step S10B is positive, the process proceeds to step S40B via steps S20 and S30. In step S40B, the CPU 21 changes the assist current value I to a vehicle driving current value Iq (Iq>0), which is needed when the vehicle is driving.

The vehicle driving current value Iq is the uppermost value of the assist current value I during the fail-safe procedure. If the assist current value I is equal to or less than the vehicle driving current value Iq, the CPU 21 sends the calculated assist current value I to the current controller 37. Assist force corresponding to the vehicle speed V and the steering torque Th is thus generated. If the calculated assist current value I is greater than the vehicle driving current value Iq, the CPU 21 quickly changes the assist current value I to the vehicle driving current value Iq. In this case, the minimum assist force required when the vehicle is driving is generated.

That is, in this embodiment, suppression of the assist control is not designed to eliminate the assist force, or to set the assist current value I to zero. Instead, the suppression is designed to maintain the minimum assist force. If there is a break in the motor M, the motor M is not actuated. Thus, the minimum safety of the power steering system is maintained without reducing the assist current value I to zero.

When the process proceeds to step S70B from step S40B via steps S50 and S60, the CPU 21 determines that there is an abnormality in the motor M if the deviation between the assist current value I and the motor driving current Im is greater than the fifth determination value, as in step S10A of FIG. 6.

If the outcome of step S70B is negative, the process proceeds to steps S80, S90, and S100. In step S100B, the CPU 21 resumes the assist control and resets the third determination value T3 to zero. Then, the CPU 21 terminates the program.

In this embodiment, the immediately preceding current value In is gradually increased at every predetermined interval such that the immediately preceding current value In converges on the assist current value I, which corresponds to the current vehicle speed V and the current steering torque Tb.

Figure 8:
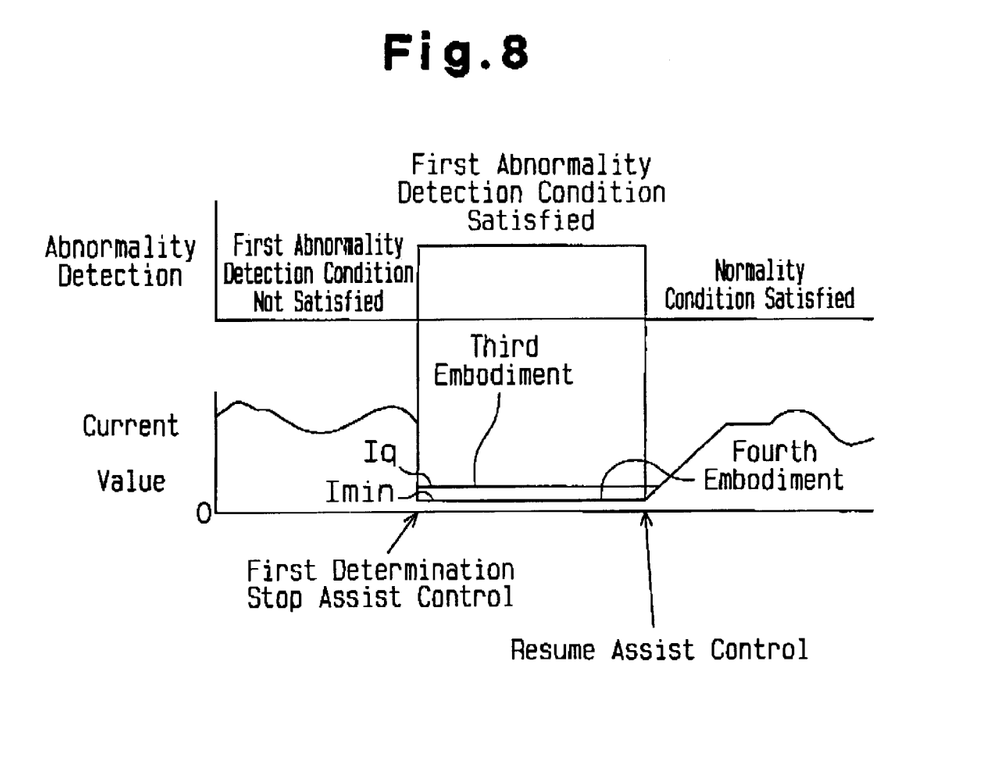
FIG. 8 is a time chart showing the relationship between a current value and abnormality detection according to the third embodiment and a fourth embodiment.

In the chart of FIG. 8, "First Abnormality Detection Condition Satisfied" refers to a state in which the outcome of step S10B is positive, that is, there is a break in the motor M, and the outcome of step S30 is positive, that is, the first accumulated time T1 is greater than the first determination value Ts1. "First Abnormality Detection Condition Not Satisfied" refers to a state in which one of the conditions is established. "Normality Condition Satisfied" refers to a state in which the outcome of step S70B is negative, that is, there is no break in the motor M, and the outcome of step S90 is positive, that is, the third accumulated time T3 is greater than the third determination value Ts3.

In this embodiment, when the assist control is stopped, that is, when the first abnormality detection condition is established, the CPU 21 quickly changes the assist current value I, which corresponds to the current vehicle speed V and the Current steering torque Th, to the vehicle driving current value Iq.

When the normal condition is established, the CPU 21 gradually increases the vehicle driving current value Iq toward the assist current value I.

This embodiment provides the following advantages.

When detecting an abnormality in the motor M, the CPU 21 suppresses the assist control. While suppressing the assist control, the CPU 21 determines whether there is an abnormality in the motor M based on the second determination value Ts2. Therefore, there is sufficient time for determining whether there is an abnormality in the motor M, which prevents erroneous determinations.

If the motor M returns to normal while the assist control is being suppressed, the assist control is resumed.

Since the CPU 21 determines whether there is an abnormality in the motor M while suppressing the assist control, fluctuations of current value due to manipulation of the steering wheel are reduced. This permits an abnormality in the sub power supply circuit 28 to be reliably detected, When detecting an abnormality in the motor M, the CPU 21 changes the assist current value I to the predetermined current value Iq, which is a minimum value required when the vehicle is driving. For example, even if a detection of an abnormality of the motor M is an erroneous determination, the assist force is generated Thus, the erroneous determination does not adversely affect the steering while the vehicle is driving.

If the assist control is resumed when the motor M returns to normal, the current value is not abruptly raised, and the amount of change of the current value is small as shown in FIG. 8. Therefore, the steering feeling is not suddenly changed.

A fourth embodiment of the present invention will now be described with reference to FIGS. 7 and 8.

This embodiment is different from the embodiment of FIG. 7 in the contents of steps S10B, S40B, and S70B. Like or the same reference numerals are given to those components that are like or the same as the corresponding components of the embodiment shown in FIG. 7.

In step S10B, the CPU 21 determines whether the rotation direction of the motor M is abnormal, or whether the breaker circuit 40 is abnormal.

Determination of whether the rotation direction of the motor M is abnormal is performed by comparing the RD signal with the RS signal or by comparing the LD signal with the LS signal. Specifically, if the outcome of step S10B is positive, in other words, if the compared signals are in different directions, the CPU 21 determines that the rotation direction of the motor M is different, that is, the breaker circuit 40 is abnormal.

It the outcome of step S10B is negative, in other words, if the compared signals are in the same direction, the CPU 21 determines that the rotation direction of the motor M is the same, that is, the breaker circuit 40 is not abnormal.

If the outcome of step S10B is negative, the process proceeds to steps S20, S30, and S40B. In this embodiment, the assist current value I is quickly changed to a minimum current value Imin (Iq>Imin>0) in step S40. With the minimum current value Imin, no assist power is outputted to the motor M (see FIG. 8).

If the rotation direction of the motor M is abnormal as in this embodiment, the assist force must be immediately eliminated for safety. However, since the motor driving current Im must be monitored for continuously monitoring the abnormality in step S60, the assist current value I cannot be changed to zero as in the embodiment of FIG. 3.

In this embodiment, the predetermined value is set to the minimum current value Imin, which is greater than zero but does not generate the assist force. This eliminates the assist force while permitting the abnormality to be continuously monitored.

If the outcome of step S60 is negative, the process proceeds to step S70B.

In step S70B, whether the rotation direction of the motor M is abnormal is determined under the same conditions as in step S10B.

In addition to the advantages of the third embodiment, this embodiment has the following advantages.

(1) When detecting an abnormality in the breaker circuit 40, the CPU 21 quickly decreases the assist current value I, which corresponds to the current vehicle speed V and the current steering torque Th, to the minimum current value Imin (Iq>Imin (predetermined value)>0). As a result, an abnormality in the breaker circuit 40 is continuously monitored while eliminating the assist force.

It should be apparent to those skilled in the art that the present invention may be embodied in many other specific forms without departing from the spirit or scope of the invention. Particularly, it should be understood that the invention may be embodied in the following forms.

In the embodiment of FIGS. 1 to 4, whether there is an abnormality in the torque sensor 31 or in the interface of the detection signal of the torque sensor 31 may be detected based on the detection signal of the torque sensor 31. In this case, whether there is an abnormality in the torque sensor 31 is determined according to a conventional method based on whether the level of the detection signal of the torque sensor 31 is an abnormal level.

In this case, the CPU 21 determines whether the detection signal of the torque sensor 31 is abnormal in steps S10 and S70 shown in FIG. 3.

In the embodiment of FIGS. 1 to 4, the CPU 21 may detect whether there is an abnormality in the battery power supply circuit instead of the sub power supply circuit 28.

The battery power supply circuit includes the battery B and a voltage monitoring circuit in the CPU 21 that monitors the voltage supplied from the battery B. Whether there is an abnormality in the battery power supply circuit is determined according to a conventional method based on whether the level of the power supply voltage is an abnormal level.

In this case, the CPU 21 determines whether the signal of voltage from the battery B is abnormal in steps S10 and S70 shown in FIG. 3.

In steps S10A and S70A of the embodiment of FIG. 6, the CPU 21 may determine that there is an abnormality that a short circuit is established between the circuit containing the motor M and a higher voltage side (for example, a circuit to which the voltage of the battery B is applied) based on a sixth determination value. The sixth determination value represents a state in which the circuit of the motor M establishes a short circuit with the higher voltage side.

In the embodiment of FIG. 6, the CPU 21 may determine whether the sum of the terminal voltages of the motor M is higher than a seventh determination value, which is higher than the voltage of the battery B. The seventh determination value is higher than the voltage value of the battery B and is used for determining that the FETs 51 to 54 establish a short circuit. Further, when the sum of the terminal voltages of the motor M is less than an eighth determination value that is less than the seventh determination value, the CPU 21 may determine that the FETs 51 to 54 establish a short circuit. The eighth determination value is lower than the voltage of the battery B and is used for determining that the FETs 51 to 54 establish a short circuit.

In steps S10B and S70B of FIG. 7, the CPU 21 may detect that the motor driving current Im is fixed to an abnormally low value.

In each embodiment, the assist control may be executed in accordance only with the steering torque Th.

Therefore, the present examples and embodiments are to be considered as illustrative and not restrictive and the invention is not to be limited to the details given herein, but may be modified within the scope and equivalence of the appended claims.

What is claimed is:

1. A control apparatus of an electric power steering system coupled to a steering wheel, wherein the electric power steering system includes a motor and a circuit related to control of the motor, wherein the motor generates assist force for reducing steering force of the steering wheel, the apparatus comprising:

calculating means, which calculates an assist current value that corresponds to the assist force based on steering torque of the steering wheel;

controlling means, which executes assist control of the motor based on the assist current value such that the motor generates the assist force;

determining means for determining an abnormality in the circuit;

suppressing means, which suppresses the assist control when an abnormality in the circuit is determined, wherein, if the determination of an abnormality has continued longer than a predetermined time since the suppression of the assist control, the suppressing means opens relay means that permits electric power to be supplied to the motor; and canceling means, wherein, when it is determined that the circuit returns to normal with the assist control suppressed, the canceling means cancels the suppression of the assist control.

2. The control apparatus according to claim 1, wherein, when the determining means determines an abnormality in the circuit, the suppressing means gradually decreases the assist current value to a predetermined value from a value at a time before the abnormality was determined.

3. The control apparatus according to claim 2, wherein the predetermined value is other than zero and does not cause the motor to generate assist force.

4. The control apparatus according to claim 2, wherein the predetermined value is zero.

5. The control apparatus according to claim 1, wherein, when the determining means determines an abnormality in the circuit, the suppressing means quickly decreases the assist current value to a predetermined value from a value at a time before the abnormality was determined.

6. The control apparatus according to claim 5, wherein the predetermined value is other than zero and does not cause the motor to generate assist force.

7. The control apparatus according to claim 5, wherein the predetermined value is zero.

8. The control apparatus according to claim 1, wherein, when it is determined that an abnormality generates in the circuit, the suppressing means suppresses the assist current value, and when it is determined that the circuit returns to normal with the assist control suppressed, the canceling means gradually increases the assist current value from the suppressed value toward a value at a time before the determining means determined the abnormality in the circuit.

9. The control apparatus according to claim 2, further comprising detecting means, wherein the detecting means detects an abnormality in a torque sensor for detecting steering torque of the steering wheel, and wherein the determining means determines an abnormality in the circuit based on a detection result of the detecting means.

10. The control apparatus according to claim 5, further comprising detecting means, wherein the detecting means detects an abnormality in current supplied to the motor, and wherein the determining means determines an abnormality in the circuit based on a detection result of the detecting means.

11. The control apparatus according to claim 5, further comprising detecting means, wherein the detecting means detects an abnormality in the rotation direction of the motor, and wherein the determining means determines an abnormality in the circuit based on a detection result of the detecting means.

12. The control apparatus according to claim 7, further comprising detecting means, wherein the detecting means detects an abnormality in terminal voltages of the motor, and wherein the determining means determines an abnormality in the circuit based on a detection result of the detecting means.

13. The control apparatus according to claim 1, wherein, if an abnormality in the circuit is continuously detected during a predetermined first determination time in a state where the assist control is not suppressed, the determining means establishes a first determination of an abnormality in the circuit to suppress the assist control, and wherein, if an abnormality in the circuit is continuously detected during a second determination time in a state where the assist control is suppressed, the determining means establishes a second determination of an abnormality in the circuit, and, based on the second determination, the suppressing means opens the relay means.

14. A control method of an electric power steering system coupled to a steering wheel, wherein the electric power steering system includes a motor and a circuit related to control of the motor, wherein the motor generates assist force for reducing steering force of the steering wheel, the method comprising:

calculating an assist current value that corresponds to the assist force based on steering torque of the steering wheel;

executing assist control of the motor based on the assist current value such that the motor generates the assist force;

determining an abnormality in the circuit;

suppressing the assist control when an abnormality in the circuit is determined, wherein, if the determination of an abnormality has continued longer than a predetermined time since the suppression of the assist control, a relay that permits electric power to be supplied to the motor is opened; and canceling the suppression of the assist control when it is determined that the circuit returns to normal with the assist control suppressed.

* * * * *